Sept. 19, 1933.  T. M. CRAMER ET AL  1,927,014
PROCESS FOR THE PRODUCTION OF BORIC ANHYDRIDE, AS BORIC ACID, FROM
MINERALS CONTAINING BOTH ALKALI AND ALKALINE EARTH METALS
Filed Aug. 12, 1926  2 Sheets-Sheet 1

WATER SOLUBILITY CURVE OF BORIC ACID ANHYDRIDE
IN THE PRESENCE OF FREE SODIUM OXIDE
AT CONSTANT TEMPERATURE OF 30° CENTIGRADE

Fig. 1.

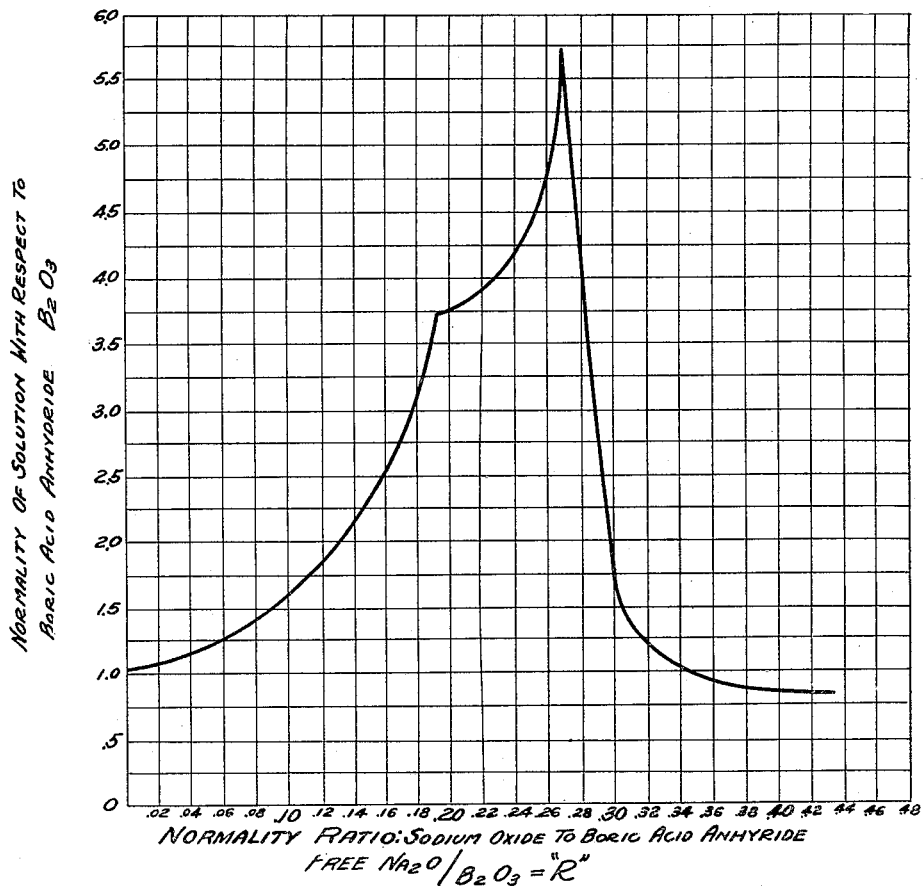

NORMALITY RATIO: SODIUM OXIDE TO BORIC ACID ANHYDRIDE
FREE $Na_2O/B_2O_3 = "R"$

Fig. 2.

(c) $2CaO \cdot Na_2O \cdot 5B_2O_3 + Na_2O \cdot 2SO_2 + 7B_2O_3$
[Pulverized Ulexite] [Mother liquor saturated with $B_2O_3$]

$= 2(CaO \cdot SO_2) + 2\ FREE\ Na_2O + 12B_2O_3$
[Rejected precipitate] [Values in filtrate]

Fig. 3.

(d) $2Na_2O + 12B_2O_3 + 3SO_2 + O = Na_2O \cdot SO_3 + Na_2O \cdot 2SO_2 + 7B_2O_3$
[Regenerated mother liquor]

$+ 5B_2O_3$
[Precipitated as $H_3BO_3$]

INVENTORS
THOMAS M. CRAMER
GEORGE A. CONNELL

ATTORNEY

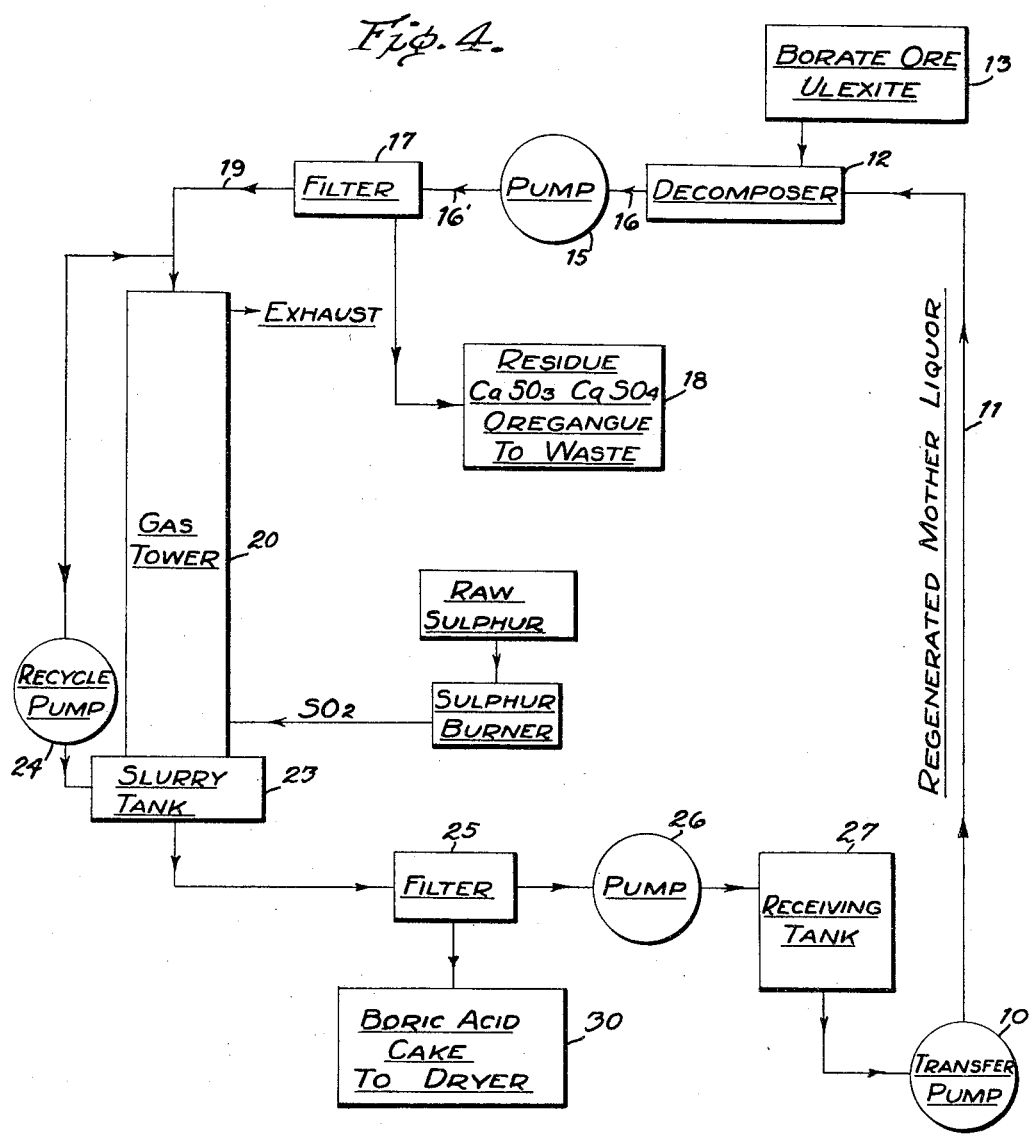

Patented Sept. 19, 1933

1,927,014

UNITED STATES PATENT OFFICE 1,927,014

PROCESS FOR THE PRODUCTION OF BORIC ANHYDRIDE, AS BORIC ACID, FROM MINERALS CONTAINING BOTH ALKALI AND ALKALINE EARTH METALS

Thomas M. Cramer, Long Beach, and George A. Connell, Wilmington, Calif., assignors to Pacific Coast Borax Company, a corporation of Nevada Application August 12, 1926. Serial No. 128,748

3 Claims. (Cl. 23—149)

As implied by the above title this invention relates to processes or methods involving a decomposition of so-called "insoluble" borates, such as ulexite to yield boric acid; and it relates more particularly to processes utilizing, in a novel manner, the action of certain sulphur compounds, without the aid of artificial heat.

Processes using sulphur dioxide, and/or sulphurous acid and/or sulphuric acid in the production of boric acid or boric acid anhydride are well known; and it is also well known that sulphur dioxide may be produced by burning sulphur or pyrites in a surplus of air—as indicated by the reaction (a) $S + O_2 = SO_2$, sulphurous acid resulting from a dissolving of the sulphur dioxide in water:

(b) $SO_2 + H_2O = H_2SO_3$

Ulexite, in its natural state, contains water of crystallization; but processes of concentration heretofore in commercial operation have frequently reduced ulexite to a practically anhydrous state. For the purposes of this description, the chemical composition of ulexite, as a typical raw material for use in our novel process, will accordingly be expressed with reference to the anhydrous condition—although it is to be understood that the operations described may be applied to borates in either a hydrous or an anhydrous condition.

Anhydrous ulexite $= CaNaB_5O_9$ or $(2CaO.Na_2O.5B_2O_3)$;

but various calcium borates or mixed borates may be worked with facility by the process hereinafter described; and, although we may direct a separate application or applications to the utilization of borates containing alkali earth metals only, it should be understood that our present application is not limited to the working of ulexite.

For comparison, we may mention that a common method of producing boric acid from borate ores involves a reduction of the ulexite to a comparatively fine state of subdivision, followed by a treatment with water and sulphuric or sulphurous acid at an elevated temperature,—gangue and calcium sulphate or calcium sulphite being filtered off while the mixture is hot. The filtrate is then permitted to cool to such a temperature that boric acid may be obtained by crystallization; and the boric acid is recovered from the cooled solution in a known manner.

It should be clearly understood that the methods set forth above and herein cited for purposes of comparison are carried out under heat; and, that the boric acid is produced by the subsequent cooling of a solution, to effect a crystallization of desired products; and the described processes, as now in commercial use, have the following notable drawbacks as compared with the process which we have discovered and herein claim.

(1) Borate ores are frequently associated with limestone and with other carbonates which also react with the liberating or decomposing reagent—sulphuric or sulphurous acid; and this incidental reaction implies a waste of reagents, and a corresponding increase in the amounts required to produce a given quantity of boric acid.

(2) Alternate heating and cooling of solutions has been required—which is an important item of expense and has practically prevented the chemical treatment of the raw material at or near those points—often in desert regions—where the ulexite, or its equivalent, is mined.

We propose a process for the production of boric acid which, in contrast with the known processes above outlined does not require the use of heat, and which is notably more economical in its use of decomposing reagents. In the execution of our process, while there may be considerable variations in the temperatures of solutions (such variations being due to, for example, weather conditions and/or to what we may term an "accidental" addition of heat, incidental to the burning of sulphur) for all purposes of our process the temperature of solutions may remain constant,—and herein lies one important economy in our unique process.

As to the chemical theory of our process, we make use of ascertained variations in the solubility of the borate ion or boric acid anhydride ($B_2O_3$) in the presence of varying amounts of sodium oxide ($Na_2O$),—it being understood that the latter is to be present in a state enabling it to combine with the borate ion, or boric acid anhydride ($B_2O_3$).

Referring to the drawings:

Fig. 1 is a chart indicating approximately the solubility of boric acid anhydride at one temperature (30° C. or 86° Fahrenheit), varying ratios of sodium oxide relatively to boric acid anhydride being present.

Fig. 2 is an Equation (c) illustrating one step in our novel process, with explanatory legends.

Fig. 3 is an Equation (d) pertinent to a subsequent (gassing) step—the steps illustrated by Figs. 2 and 3 being suitable for indefinite repetition,—optionally in conjunction with other steps hereinafter described.

Fig. 4 is a flow sheet showing the steps of the process.

From the mentioned chart, it will be seen that we can get a comparatively high concentration of boric acid anhydride, employing a suitable ratio of sodium oxide, sodium sulphite, sodium bisulphite and/or sodium sulphate (any or all of them) by making use of the following decomposing reactions:

(e)  $2CaNaB_5O_9 + 2Na_2SO_3 = 2CaSO_3 + (3Na_2O + 5B_2O_3)$ (f)  $2CaNaB_5O_9 + 2NaHSO_3 = 2CaSO_3 + (2Na_2O + 5B_2O_3) + H_2O$ (g)  $2CaNaB_5O_9 + 2Na_2SO_4 = 2CaSO_4 + (3Na_2O + 5B_2O_3)$;

and our new processes may be said to consist essentially in an alternation of the reactions of Fig. 2 and Fig. 3, consistently with the indications of Fig. 1—any usual or preferred apparatus (as mere wooden vats, etc. being employed.)

For convenience in illustrating the invention and to avoid confusion, we have illustrated the reactions as taking place in the anhydrous state. Actually, when in aqueous solution the $Na_2O$ is probably present as $Na_2O.2SO_2 + H_2O = 2NaHSO_3$.

We emphasize at this point that the last of the above reactions (that between ulexite and sodium sulphate) takes place only under certain conditions; and ascertainment of these conditions constitutes a portion of the discovery herein disclosed—the maintenance of said conditions being a feature to which claims are hereinafter directed.

Since the analytical data pertinent to our process may be subject to various interpretations, several compositions and combinations in solution (containing sodium oxide, boric acid anhydride, sulphur dioxide and/or sulphuric acid anhydride) are herein made the subject of special definition.

"Fixed sodium oxide": We herein designate sufficient sodium oxide to combine with all of the sulphuric acid anhydride present to form sodium sulphate as "fixed sodium oxide." This fixed sodium oxide cannot be detected by titration with standard hydrochloric acid.

"Free sodium oxide": A dilute solution of sodium acid sulphite is approximately neutral to methyl red, as is also a dilute solution of boric acid anhydride. Any sodium oxide determinable by titration of a process liquor with a standard hydrochloric acid solution, using methyl red as an indicator, is herein called "free sodium oxide"; and is considered as in combination with, or as free to combine with, the boric acid anhydride.

"Total alkaline sodium oxide:" This is herein considered to be that sodium oxide which is present as "free sodium oxide" plus that which is present as sodium acid sulphite; and is determined by adding an excess of standard hydrochloric acid heating to expel sulphur dioxide and then titrating the excess of acid with sodium hydroxide, using methyl red as an indicator. In a solution containing only "free $Na_2O$" the "total alkaline $Na_2O$" is the same as the free $Na_2O$, whereas in a solution containing both free $Na_2O$ and $NaHSO_3$ or $Na_2O.2SO_2$ the value for the total alkaline sodium oxide is equal to the quantity of free $Na_2O$ present as alkali plus the $Na_2O$ present as bisulphite, the latter being substantially neutral to methyl red unless steps are taken to expel sulphur dioxide from solution.

To illustrate the above system of nomenclature expressing in terms of normality the composition of a "process liquor" obtained by sulphiting, we might have (although the boric acid content may vary widely,—as between .50N and 1.7N;

|  | Normal |
|---|---|
| Boric acid anhydride | 1.05 |
| Free sodium oxide | .00 |
| Total alkaline sodium oxide | .15 |
| Sulphur dioxide | .30 |
| Fixed sodium oxide | .75 |

The above values may have been determined by analyzing a mother liquor of the type indicated in Fig. 2 and reducing the values obtained to terms of normality. It will be seen from Fig. 2 that the $Na_2O$ is present as sodium acid sulphate and can be determined only by adding an excess of HCl and titrating back with alkali, and so comes within the definition of total alkaline $Na_2O$. Inasmuch as the fixed $Na_2O$, which is present in solution as sulphate, takes no part in the reaction as shown, we have not indicated this compound in Equation $h$.

It will be useful herein to define and use a ratio designated as "R", letting this "R" equal the "free sodium oxide" divided by the boric acid anhydride—both expressed in terms of normality. Thus, in the case of the above solution $$"R" = \frac{.00}{1.05} = .00.$$

Further illustrating the present use of the quantity "R", another characteristic solution, obtained in the process herein described, results from a treatment of a new batch of ulexite with "process liquor" or "mother liquor" of the character referred to in the above tabulation. Such treatment might theoretically produce a mixture substantially as follows: (See Fig. 2)

|  | Normal |
|---|---|
| Boric acid anhydride | 1.80 |
| Free sodium oxide | .30 |
| Total alkaline sodium oxide | .30 |
| Sulphur dioxide | .00 |
| Fixed sodium oxide | .75 |

These values may be determined in the same manner as those in the foregoing table by analyzing a solution obtained by treating $(2CaO.Na_2O.5B_2O_3)$ with the mother liquor. These particular figures are for an "ideal" solution and it will be observed that the value of 1.80 for the boric acid anhydride bears the ratio of 12 to 7 to the value of 1.05 in the other table. This is the ratio of molecular proportions present in Equation $c$ (Fig. 2). In the last table it will be noted that the values for the "free $Na_2O$" and the "total alkaline $Na_2O$" are the same, indicating that there is no sodium acid sulphite present. The theoretical value of "R" in the enriched solution is the ratio of "free $Na_2O$" (expressed in terms of normality) to the $B_2O_3$ (expressed in terms of normality). In other words where the reaction of Equation $c$ has gone to completion we can express "R" as the ratio of the number of molecules of $Na_2O$ to the number of molecules of $B_2O_3$ present in the equation. In other words $$R = \frac{2}{12} = .167$$

or (from the table $$R = \frac{.30}{1.80} = .167).$$

It should be understood that the ratio of free $Na_2O$ to $B_2O_3$ in the enriched solution referred to in Fig. 2 as a filtrate may vary within wide limits.

The two solutions to which the above tabulations refer—although somewhat idealized (since unnamed ingredients such as chlorides, silicates, ferrous and ferric salts are likely to be present)— illustrate the principles involved in our mentioned terminology; but, in actual practice, it may commonly be found most satisfactory to carry an excess of sodium bisulphite, above that theoretically required—in order to assure a more complete decomposition of the borate ore.

As applied above, our process utilizes alternate generation and removal of "free sodium oxide," as defined, in a solution containing boric acid anhydride,—the generation of the "free sodium oxide" being accompanied by the addition of boric acid anhydride; and the removal of the "free sodium oxide," being effective to produce a precipitation of the added boric acid anhydride—in the form of boric acid, $H_3BO_3$.

The generation of "free sodium oxide" creates a condition which permits of the presence of (and holding in solution of) boric acid anhydride, in amounts exceeding those which the solutions or liquors would, at any given operating temperature, be capable of holding in solution, were the "free sodium oxide" not present. It therefore follows that the "mother liquor", although practically or completely saturated with boric acid anhydride, can, if properly handled, be further enriched with boric acid anhydride without a change in temperature. Enrichment, in processes now in vogue, is accompanied by the addition of heat,—a raising of the temperature of the solution in order to raise the saturation point with reference to boric acid anhydride. Our solution, on the other hand, is enriched without the aid of heat; and it can be conveniently filtered clear of any gangue material and/or precipitated or undissolved calcium compounds that may have been associated with the boric acid anhydride in the ulexite or other borate. The clarified solution may then be "gassed" by sulphur dioxide in any suitable absorption apparatus and in any known or preferred manner, the boric acid being precipitated; and the theory of the chemical changes involved may be illustrated by the chemical reactions set forth in Equations (c) and (d) constituting Figs. 2 and 3.

The reactions referred to produce a filtrate which from the second tabulation above (Pg. 7) will be seen to contain "free sodium oxide" and boric acid anhydride in substantially the ratios $R=.167$; and reference to the solubility chart shows that at $R=.167$ (assuming a temperature of 86° F. or thereabout—a frequent desert temperature) the solubility of anhydrous boric acid is over 2.5 normal—whereas the solubility of boric acid anhydride, in the absence of the "free sodium oxide", is only about 1.0 normal. This reaction as set forth in the tabulation referred to has produced a 1.8 normal solution—which, of course, is only three-fourths saturated with respect to the boric acid anhydride, and is therefore suitable, as mentioned, for filtration and manipulation without danger of crystallization and consequent loss of values.

After "gassing" with sulphur dioxide, the "free sodium oxide" disappears; and consequently the solubility of the boric acid anhydride is lowered. By the same reaction whereby the boric acid anhydride derived from the ulexite is precipitated, a mother liquor is regenerated; and this mother liquor has a composition similar to that with which the cycle was started; so that the described steps will be seen to be capable of indefinite repetition, with successive batches of ulexite—the inexpensive sulphur dioxide being the only reacting material, in addition thereto, which, in theory, requires to be replenished.

It is desirable, in practice, to reproduce a mother liquor having about the same relative quantities of sulphur dioxide, free sodium oxide and total alkaline sodium oxide as did the mother liquor at the start of the cycle; but the reaction between ulexite and sodium acid sulphite ($NaHSO_3$) produces a ratio of free sodium oxide to boric acid anhydride of 2 to 5 or $R=.40$ (see Equation $f$) and at this ratio, boric acid is not comparatively speaking, very soluble. In other words, we desire only such a quantity of sodium acid sulphite or sodium sulphite in mother liquors as will, with the sodium sulphate and ulexite, produce a ratio of "free sodium oxide" and boric acid anhydride that is highly soluble; but it will be seen from Figs. 2 and 3, Equations (c) and (d), that the ulexite used in the recurring cycles above outlined must, in the absence of oxidation reactions, constantly add sodium oxide to the liquors; and if this sodium oxide is allowed to remain in the "free" state or as "alkaline sodium oxide", the desired ratios of "free sodium oxide" and boric acid anhydride will not be maintained; and we may accordingly take advantage of the oxygen of the air to induce oxidation of part of the sulphur dioxide or sodium sulphite to sulphate.

Much of the desired oxidation may take place during the "gassing" of enriched liquors and/or during filtering of the precipitated boric acid from the mother liquors; and/or it can be encouraged or hastened by admitting an excess of air to the sulphur burner, and/or by bubbling air through mother liquors, and/or by other means of changing sulphites to sulphates—some oxidation of the sulphur dioxide to sulphur trioxide naturally taking place in any sulphur burner. Although the mentioned oxidation may occur, to a greater or less degree, as an incidental consequence of a handling of sulphur dioxide or sulphite liquors in the described manner, we regard as an important part of our discovery the use and control of this oxidation as a means of controlling the amount of "free sodium oxide" or "alkaline sodium oxide" in our liquors,—so that sodium oxide is converted to "fixed sodium oxide" and therefore does not unfavorably effect the solubility of the boric acid anhydride. That is to say, we regard the use, in conjunction with steps of the general character described, of any steps to control or to induce oxidation, to produce a liquor best suited to the requirements of our process, as an important though optional part of our invention.

The "fixed sodium oxide" may, however, be used under certain operating conditions, to decompose borate ores; and one division of our discovery obviously deals with the regeneration of sodium oxide from the "fixed" to the "free" state.

Under ordinary conditions sodium sulphate reacts only to a limited extent upon ulexite to form calcium sulphate and to liberate "free sodium oxide"—the reaction being $2CaNaB_5O_9 + 2Na_2SO_4 =$
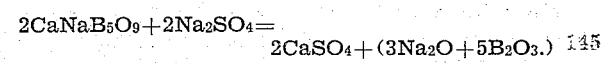
$2CaSO_4 + (3Na_2O + 5B_2O_3.)$ So far as is known, the foregoing reaction never has been utilized commercially to liberate boric acid anhydride from ulexite, the usual explanation being that calcium sulphate, freshly precipitated, appears more soluble than the calcium borate; and, such being the case, the reaction does not proceed even approximately to completion. We have discovered, however, that if a certain amount of "free boric acid" (represented in Equation (i) by $9B_2O_3$) is present in solution with the sodium sulphate, then the reaction does proceed in a manner making the same commercially applicable. This may be illustrated by one of several forms of reaction as, for example:

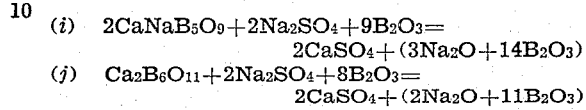

(i)  $2CaNaB_5O_9 + 2Na_2SO_4 + 9B_2O_3 =$
   $2CaSO_4 + (3Na_2O + 14B_2O_3)$
(j)  $Ca_2B_6O_{11} + 2Na_2SO_4 + 8B_2O_3 =$
   $2CaSO_4 + (2Na_2O + 11B_2O_3)$

As to the explanation of reactions such as those indicated by Equations (i) or (j) we have discovered that the calcium borate, in the presence of "free" boric acid anhydride as set forth in the reaction, and under the indicated conditions, is more soluble than the calcium sulphate; and therefore the decomposition of ulexite proceeds practically to completion.

The essential condition of the liquor required to get this exceedingly practical decomposition appears to be that the solution shall at all times be more acid than is a solution which contains boric acid anhydride and "free sodium oxide" in the ratio $R=.26$. As will appear from the curve in Fig. 1 this value gives a small factor of safety before the apex is reached in the solubility curve.

Ascertainment of the conditions necessary for the regeneration of "free sodium oxide" from sodium sulphate in the general manner above set forth constitutes one important feature of our discovery of a commercially practicable "cold" process for boric acid production; but the use of the last mentioned reaction, dependent upon the presence of sodium sulphate in our process, is of very material aid in maintaining the proper ratio of "free sodium oxide" to boric acid anhydride in the enriched liquors; and, to afford further guidance, we may mention that the minimum solubility of boric acid anhydride in reaction solutions appears to be reached when the sodium oxide is all in either the "fixed sodium oxide" state or is combined with sulphurous acid, to make sodium bisulphite—in other words, when the solution is neutral or is acid to methyl red, there being no "free sodium oxide" present.

Many natural borate ores contain both colemanite and ulexite; and we may accordingly use the sodium sulphate formed in the oxidation of liquors to decompose any colemanite which may be combined with the ulexite. If ulexite only is being processed, and sulphate accumulates in such large quantities as to interfere with the purity of the product (boric acid) the sodium sulphate can be gotten rid of by any of several methods, as:

(1) By crystallization, or cooling, or refrigeration.

(2) By allowing sulphate to appear in boric acid product, to be removed therefrom by washing with water.

(3) By discarding liquors heavy in sodium sulphate,—beginning again with empty vats.

(4) By reserving liquors heavy in sodium sulphate to be used in processing and decomposing colemanite. For example:—if the sodium sulphate becomes excessive, the mother liquor may be cooled after the ore is added and before the sulphiting step to precipitate the sodium sulphate. The sodium sulphate is not required in the reaction between the mother liquor and the ulexite ore, and is, therefore, not indicated in the equation shown in Fig. 2.

We may use the reaction between sodium sulphate and ulexite in the presence of boric acid anhydride (in solution as free boric acid) to regenerate a required quantity of "free sodium oxide" in case the oxidation has, for some reason, been allowed to proceed to a greater extent than is consistent with economical operation.

The flow sheet in Fig. 4 illustrates a specific example of a preferred cycle of operations in the practice of our process. Referring to the flow sheet, we show the regenerated mother liquor as being delivered from a transfer pump 10 through a pipe 11 to a decomposer 12 which may be in the form of a suitable vat where the mother liquor reacts with ulexite received from a suitable hopper indicated at 13 according to the Equation c in Fig. 2.

The slurry in the decomposer which consists of gangue, precipitated $CaSO_3$, $CaSO_4$, and a solution of free $Na_2O$ and $B_2O_3$ is pumped by means of the pump 15 through pipe lines 16 and 16' and a filter 17. The residue from the filter is discarded as indicated at 18 and the filtrate passes through line 19 to a gas tower 20. As the filtrate passes downwardly through the tower 20 it is subjected to the action of the gaseous products of combustion from a sulphur burner 21, thus the boric acid is liberated and the mother liquor is regenerated according to the reaction in Equation d (Fig. 3). To improve the efficiency of this step we may recirculate the solution through the tower from a slurry tank 23 at the bottom of the tower. A recycle pump 24 is shown as being provided for this purpose. The slurry from the slurry tank 23 passes through filter 25 which separates the precipitated boric acid from the regenerated mother liquor. The regenerated mother liquor is delivered by means of pump 26 to a receiving or storage tank 27 which has its outlet connected with the transfer pump 10 and the boric acid cake is delivered to a drier or suitable storage vat indicated at 30.

In conclusion, we emphasize that, sulphur being capable of cheap transport (in case it is not immediately at hand) and no fuel being required in the operation of our described process, the same has the important merit that it may be executed in the immediate vicinity of a mine,— the precipitated product being then suitable for storage or for transport, and the cost of such transport being materially smaller than that involved in the handling of the original ulexite or other mineral, as mined; also that, by reason of the low temperatures of operation, and the avoidance of strong acids, the cost of the requisite handling and treating equipment may be greatly reduced, as compared with costs incurred in processes heretofore known—it being practicable to substitute wooden or iron vats, pipes, and containers for corresponding equipment heretofore made from lead, or other expensive acid-resisting materials.

Although we have herein emphasized the steps whose theory is indicated by the respective equations constituting Fig. 2 and Fig. 3 of the present application, it should be understood not only that various features of our invention might be independently used, but also that various modifications and/or adaptations of our invention might be devised by those skilled in the chemical arts to which this case relates, all without the slightest departure from the spirit and scope of our invention, as the same is indicated above and in the following claims—some of said claims being directed to the main features of our invention, others to subordinate features thereof and still others to various combinations of features which co-operate to produce the novel and advantageous results above set forth.

We claim as our invention:

1. A process of preparing boric acid from an insoluble calcium-sodium borate which comprises treating an insoluble calcium-sodium borate with a process liquor containing $B_2O_3$ and sodium sulphite, thereby forming calcium sulphite precipitate and a filtrate containing free $Na_2O$ and $B_2O_3$, filtering off calcium sulphite and passing $SO_2$ gas through the filtrate, thereby regenerating the process liquor and precipitating boric acid.

2. In the production of boric acid, a process which comprises: reacting upon a calcium-sodium borate with a mother liquor containing $B_2O_3$ and sodium sulphite ($Na_2O.2SO_2+7B_2O_3$) to precipitate calcium sulphite ($CaO.SO_2$) and form a filtrate containing free $Na_2O$ and $B_2O_3$ substantially as indicated in the following equation:

$$2CaO.Na_2O.5B_2O_3 + (Na_2O.2SO_2+7B_2O_3) = 2(CaO.SO_2) + (2 \text{ free } Na_2O + 12B_2O_3)$$

then removing the calcium sulphite ($CaO.SO_2$) and passing $SO_2$ gas through the filtrate to precipitate boric acid ($5B_2O_3$) and regenerate said mother liquor substantially as indicated in the following equation:

$$2Na_2O + 12B_2O_3 + 3SO_2 + O = Na_2O.SO_3 + (Na_2O.2SO_2+7B_2O_3) + (5B_2O_3).$$

3. In the production of boric acid, a process which comprises: reacting upon a calcium-sodium borate with a mother liquor containing $B_2O_3$ and sodium sulphite ($Na_2O.2SO_2+7B_2O_3$) to precipitate calcium sulphite ($CaO.SO_2$) and form a filtrate containing free $Na_2O$ and $B_2O_3$ substantially as indicated in the following equation:

$$2CaO.Na_2O.5B_2O_3 + (Na_2O.2SO_2+7B_2O_3) = 2(CaO.SO_2) + (2 \text{ free } Na_2O + 12B_2O_3)$$

then removing the calcium sulphite ($CaO.SO_2$) and passing $SO_2$ gas through the filtrate to precipitate boric acid ($5B_2O_3$) and regenerate said mother liquor substantially as indicated in the following equation:

$$2Na_2O + 12B_2O_3 + 3SO_2 + O = Na_2O.SO_3 + (Na_2O.2SO_2+7B_2O_3) + (5B_2O_3),$$

said process being performed under substantially atmospheric temperature conditions.

THOMAS M. CRAMER.
GEORGE A. CONNELL.